United States Patent
Chen et al.

(10) Patent No.: US 11,182,636 B2
(45) Date of Patent: Nov. 23, 2021

(54) METHOD AND COMPUTING DEVICE FOR ADJUSTING REGION OF INTEREST

(71) Applicant: Wistron Corporation, New Taipei (TW)

(72) Inventors: Po-Chun Chen, New Taipei (TW); Yu-Yen Chen, New Taipei (TW); Kuo-Ting Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 106 days.

(21) Appl. No.: 16/533,813

(22) Filed: Aug. 7, 2019

(65) Prior Publication Data
US 2020/0349382 A1    Nov. 5, 2020

(30) Foreign Application Priority Data

May 2, 2019   (TW) .................................. 108115231

(51) Int. Cl.
*G06K 9/46*      (2006.01)
*G06T 7/73*      (2017.01)
*G06K 9/32*      (2006.01)

(52) U.S. Cl.
CPC ......... *G06K 9/4609* (2013.01); *G06K 9/3233* (2013.01); *G06T 7/73* (2017.01)

(58) Field of Classification Search
CPC ................ G06K 9/3233; G06K 9/4609; G06T 2207/10016; G06T 7/11; G06T 7/246; G06T 7/73

See application file for complete search history.

(56) References Cited

U.S. PATENT DOCUMENTS

2018/0018770 A1*   1/2018   Hu ............................ G06T 7/97

FOREIGN PATENT DOCUMENTS

CN    106557767          4/2017
CN    106557767 A    *   4/2017

OTHER PUBLICATIONS

"Office Action of Taiwan Counterpart Application", dated Apr. 14, 2020, p. 1-p. 6.

* cited by examiner

*Primary Examiner* — Ross Varndell
(74) *Attorney, Agent, or Firm* — JCIPRNET (57) ABSTRACT

A method and a computing device for adjusting a region of interest (ROI) are provided. The method includes: receiving a image sequence including a current image and a previous image; generating a predefined searching area based on a previous ROI in the previous image; performing feature matching on multiple image features within the predefined searching area in the previous image and multiple image features within the predefined searching area in the current image; and adjusting a position of the previous ROI in the previous image based on the image features within the predefined searching area in the current image in response to that the image features within the predefined searching area in the current image satisfy a matching condition to obtain the current ROI in the current image.

20 Claims, 9 Drawing Sheets

FIG. 8

METHOD AND COMPUTING DEVICE FOR ADJUSTING REGION OF INTEREST

CROSS-REFERENCE TO RELATED APPLICATION

This application claims Taiwan application serial No. 108115231, filed on May 2, 2019. The entirety of the above-mentioned patent application is hereby incorporated by reference herein and made a part of this specification.

BACKGROUND

Technical Field

The disclosure relates to an object monitoring technique based on image, and more particularly to a method and a computing device for adjusting a region of interest (ROI).

Description of Related Art

As socio-demographic structure moves toward an old age composition, smart care system is mainly used to detect the behavior of the elderly, so as to determine whether the elderly are in danger or need assistance to achieve the purpose of care. Nowadays, there are many detection techniques that may monitor the physiological parameters and postures of the people being taken care of to achieve the purpose of monitoring and care. Among these techniques, the implementation of the method of smart care via image detection allow detection of the state of the people being taken care of while not disturbing them. Therefore, designing an image detection method that may improve recognition and detection efficiency is an issue of concern for the people of ordinary skill in the art.

Specifically, smart care system based on image detection uses the region of interest of a captured image to perform a variety of detections or image processing. From this, it is known that if the object, which is served as the reference basis for the setting of the region of interest, is displaced or the camera is displaced, the region of interest in the image will not conform to the area that is ready to undergo a variety of detections or image processing. Misjudgment over a variety of subsequent detections or image processing will easily occur due to mismatched areas of region of interest.

SUMMARY

In view of this, the disclosure provides a method and a computing device for adjusting a region of interest, which may improve recognition and detection efficiency. Also, it may reduce the burden of an operator in manually setting up the region of interest.

The disclosure provides a method for adjusting the region of interest which is adapted to a computing device comprising a processor. The method includes: receiving an image sequence including a current image and a previous image; generating a predefined searching area based on a previous region of interest in the previous image; performing feature matching on multiple image features within the predefined searching area in the previous image and multiple image features within the predefined searching area in the current image; and adjusting a position of the previous region of interest in the previous image based on the image features within the predefined searching area in the current image to obtain the current region of interest in the current image in response to that the image features within the predefined searching area in the previous image and the image features within the predefined searching area in the current image satisfy a matching condition.

From another point of view, an embodiment of the disclosure provides a computing device which includes a storage circuit and the processor. The storage circuit stores multiple modules. The processor is coupled to the storage circuit and configured to accesses the above modules to: receive the image sequence including the current image and the previous image; generate the predefined searching area based on the previous region of interest in the previous image; perform the feature matching on multiple image features within the predefined searching area in the previous image and multiple image features within the predefined searching area in the current image; and adjust the position of the previous region of interest in the previous image based on the image features within the predefined searching area in the current image to obtain the current region of interest in the current image in response to that the image features within the predefined searching area in the previous image and the image features within the predefined searching area in the current image satisfy the matching condition.

Based on the above, the embodiment of the disclosure may automatically detect an appropriate region of interest in the image. The appropriate region of interest matches the boundary of the reference object (for example, a bed). Thereby, based on the appropriate region of interest, the embodiment of the disclosure may improve the accuracy and efficiency of image monitoring on a specific object.

In order to make the features and advantages of the disclosure comprehensible, embodiments with reference to drawings are elaborated in detail below.

DESCRIPTION OF THE EMBODIMENTS

Part of the embodiments of the disclosure will be elaborated in detail below with reference to drawings. For the component symbols cited in the following description, the same component symbols appear in different drawings will be regarded as the same or similar components. These embodiments are only part of the disclosure and do not disclose all implementation methods of the disclosure. To be more specifically, these embodiments are merely examples of a method and a computing device for adjusting a region of interest within the scope of the claims of the disclosure.

Figure 1:
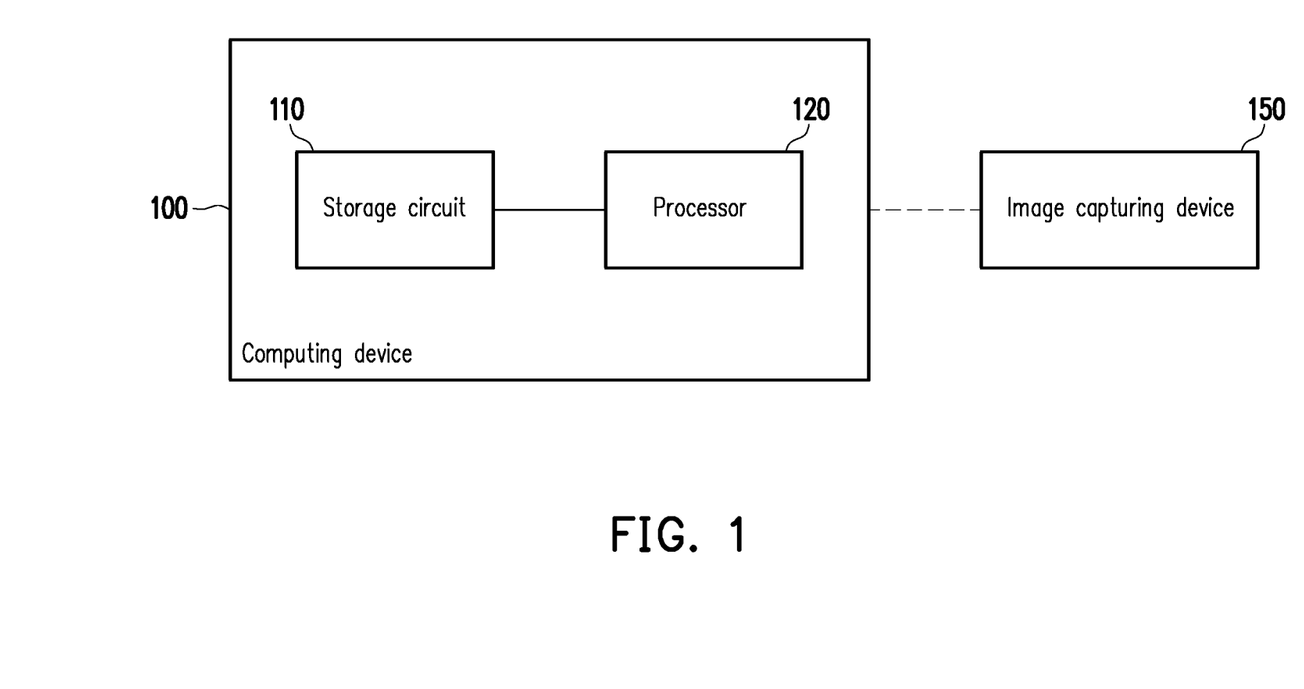
FIG. 1 is a block diagram illustrating a computing device according to an embodiment of the disclosure.

FIG. 1 is a block diagram illustrating the computing device according to an embodiment of the disclosure. However, this is only for convenience and is not intended to limit the disclosure. First, FIG. 1 introduces all components and configuration relationships of the computing device. The detailed functions will be disclosed together with FIG. 3.

A computing device 100 includes a storage circuit 110 and a processor 120, wherein the processor 120 is coupled to the storage circuit 110. In an embodiment, the computing device 100 may be a personal computer, a notebook, a server computer, a tablet computer, a smart phone, a workstation, or other computer systems or platforms that have wireless or wired connection with an image capturing device 150 via a communication interface. The image capturing device 150 may be, for example, a digital camera, a digital camera, a network camera or a surveillance camera. The communication interface of the image capturing device 150 may be a transmission interface supporting any wired connection or wireless communication standard for data transmission with other devices. In another embodiment, the computing device 100 may be an embedded system built in the image capturing device 150 or an embedded system with built-in image capturing device 150. The disclosure is not limited thereto.

The storage circuit 110 is configured to store data such as images, software modules, and program codes, which may be, for example, any type of fixed or movable random access memory (RAM), read-only memory (ROM), flash memory, hard disk or other similar devices, integrated circuits, and combinations thereof.

The processor 120 is configured to perform the computing of image processing, which may be, for example, a central processing unit (CPU), a graphic processing unit (GPU), or other programmable microprocessor for general purposes or special purposes, a digital signal processor (DSP), a programmable controller, an application specific integrated circuit (ASIC), a programmable logic device (PLD) or other similar devices, integrated circuits, and combinations thereof. In the embodiment of the disclosure, the processor 120 may load the program codes or modules recorded in the storage circuit 110 to perform a method for adjusting the region of interest provided by the embodiment of the disclosure.

In an embodiment, the computing device 100 may monitor a specific object in a shooting scene based on an image sequence captured by the image capturing device 150. Specifically, the image capturing device 150 is disposed at a fixed position, and continues to photograph according to a field of view to generate the image sequence. The image capturing device 150 provides the image sequence to the computing device 100 and the image sequence comprise multiple consecutive images respectively corresponding to different time points. The computing device 100 may detect an object information such as a position, a moving state or a posture of the specific object based on these consecutive images.

Figure 2A:
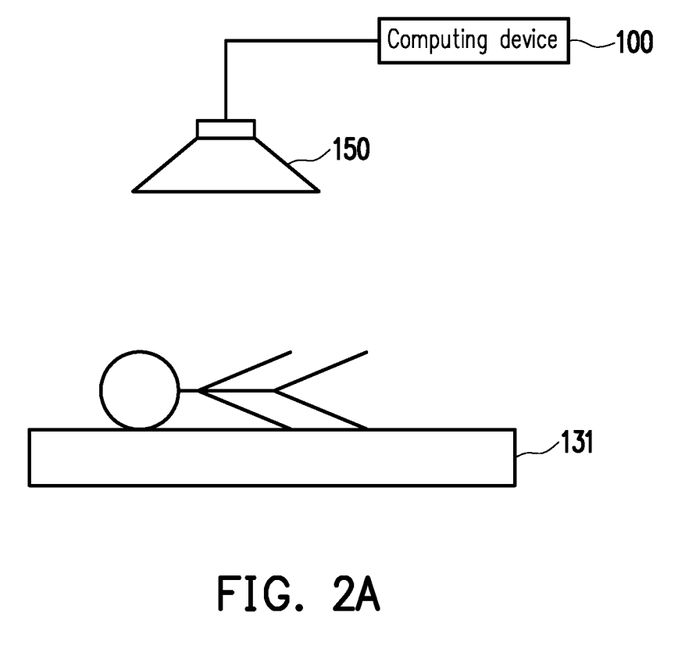
FIG. 2A and FIG. 2B are exemplary schematic diagrams illustrating an application scenario according to the disclosure.
Figure 2B:
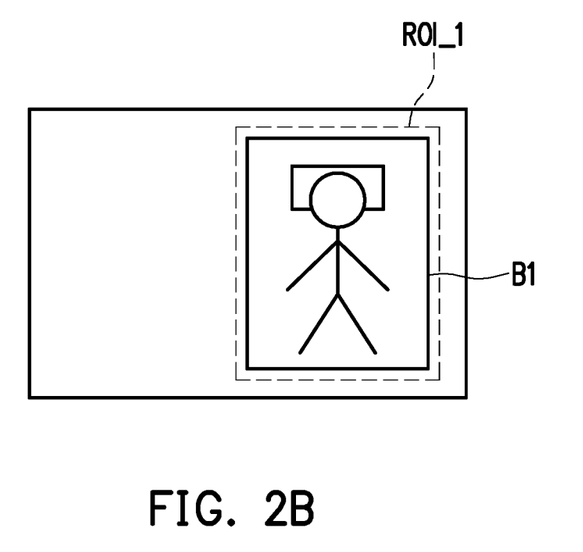

It should be noted that a setting of the region of interest may be used to circle image blocks of interest. These image blocks may be used in the subsequent monitoring of the moving state or position of the specific object in the shooting scene. For example, by setting up the region of interest, the computing device 100 may determine whether the specific object enters or leaves the region of interest based on the region of interest in the consecutive images. In the embodiment of the disclosure, the region of interest may be set to correspond to an outer rim of a reference object in the consecutive images so that the computing device 100 may perform subsequent detection and image processing based on the region of interest in the image based on the setting of the region of interest. In an application scenario, if the region of interest corresponds to a bed in a scene, the computing device 100 may determine whether the person being monitored is on the bed based on the region of interest. FIGS. 2A and 2B are the exemplary schematic diagrams illustrating an application scenario according to the disclosure. The application scenario shown in FIG. 2A is nursing care, wherein the image capturing device 150 may be disposed above a bed, a care platform or the top of a table in a home environment, a hospital, a daycare center or a senior care center. In an embodiment of FIG. 2A, the image capturing device 150 is disposed to film a bed 131 and the area around the bed 131 in the scene. With reference to FIG. 2B, a region of interest ROI_1 is a quadrilateral region disposed along an outer rim of a bed B1 in an image. Alternatively, in other application scenarios, if the region of interest is disposed, for example, corresponding to a fence, an outer rim of a platform or an outer rim of a desktop, the computing device 100 may further determine, by using the region of interest, whether the specific object is located in the area defined by the fence, the platform or the desktop in the subsequent detection and image processing. It is known that if the reference object (such as the bed, the fence, the platform or the desktop) corresponding to the region of interest is moved, the computing device 100 may not accurately detect the location and the moving state of the specific object based on an original region of interest. Therefore, the method for adjusting the region of interest of the disclosure may adjust the region of interest based on a content of the scene in real time to avoid misjudgment on the subsequent related detection based on the region of interest.

Embodiments are listed below with reference to each of the components of the computing device 100 to elaborate the detailed steps of how the computing device 100 performs the method for adjusting the region of interest.

Figure 3:
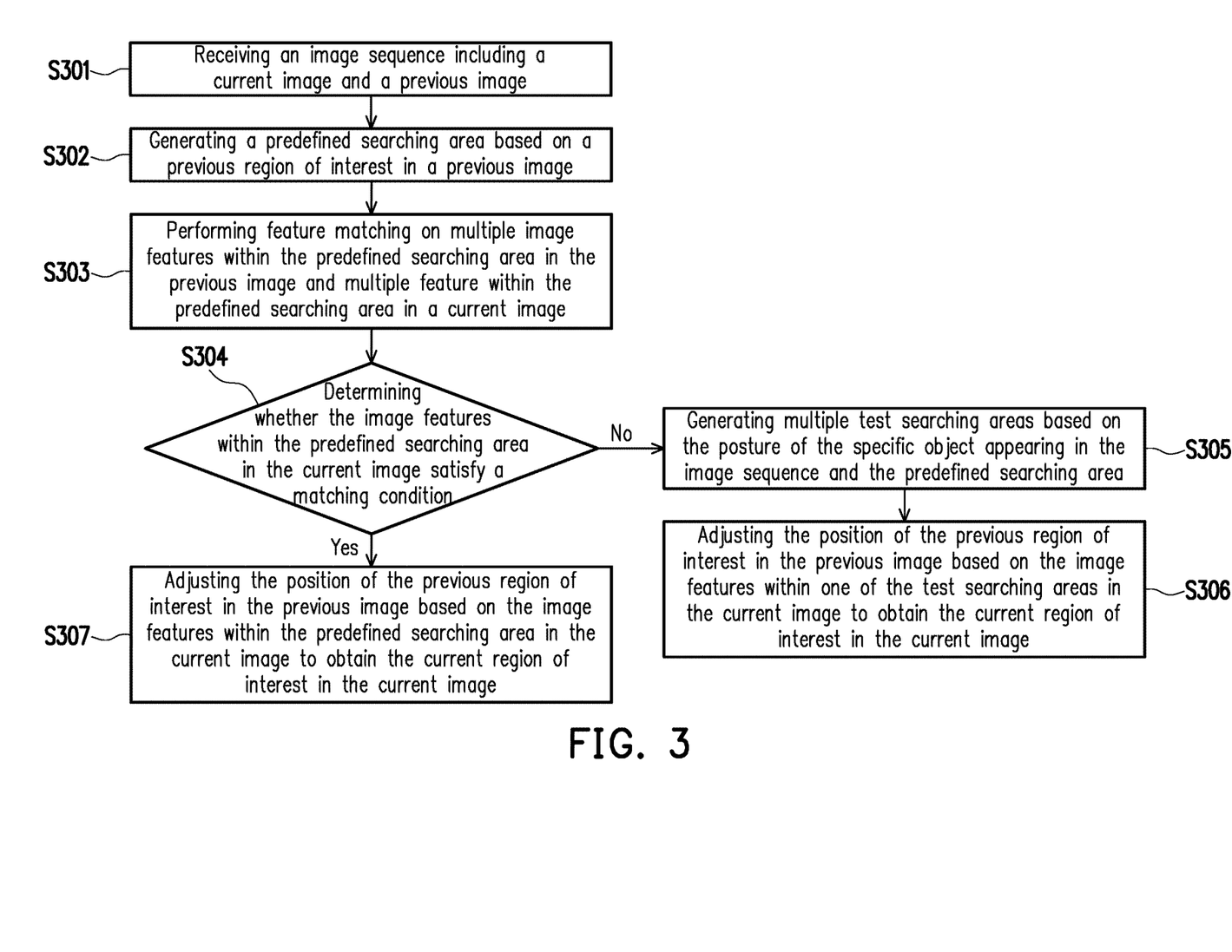
FIG. 3 is a flow chart illustrating a method for adjusting a region of interest according to an embodiment of the disclosure.

FIG. 3 is a flow chart illustrating the method for adjusting the region of interest according to an embodiment of the disclosure. With reference to FIG. 1 and FIG. 3, the method of the embodiment is adapted to the computing device 100 of the above embodiment. Detailed steps of the method for adjusting the region of interest of the embodiment are elaborated below with reference to each of the components of the computing device 100.

In step S301, the processor 120 receives the image sequence including a previous image and a current image. Specifically, the image capturing device 150 may continuously capture consecutive frames of a monitoring area. The captured consecutive images will constitute the "image sequence". In the following description, it is assumed that the field of view of the image capturing device 150 is fixed, that is, the monitoring area of the image sequence is fixed. The previous image and the current image are two consecutive frames of the image sequence. For example, if the image capturing device 150 may capture 24 images in one second, the capturing time of the previous image and the current image will differ by $\frac{1}{24}$ second.

In step S302, the processor 120 generates a predefined searching area based on a previous region of interest in the previous image. Specifically, in the embodiment of the disclosure, by analyzing the consecutive frames of the image sequence, the processor 120 may detect a correct position of the region of interest in each of the images. Herein, each of the images of the image sequence has a corresponding region of interest. The region of interest of each of the images are sequentially estimated and recorded based on the order in which the images are captured. Specifically, the processor 120 may search for a region of interest in the current image based on the predefined searching area generated by a region of interest in the previous image. Here, the region of interest in the previous image may be preset or may be generated based on image analysis. Therefore, when the processor 120 wants to estimate the current region of interest in the current image, the processor 120 will first read the previous region of interest in the previous image and generate the predefined searching area based on the previous region of interest.

Figure 4:
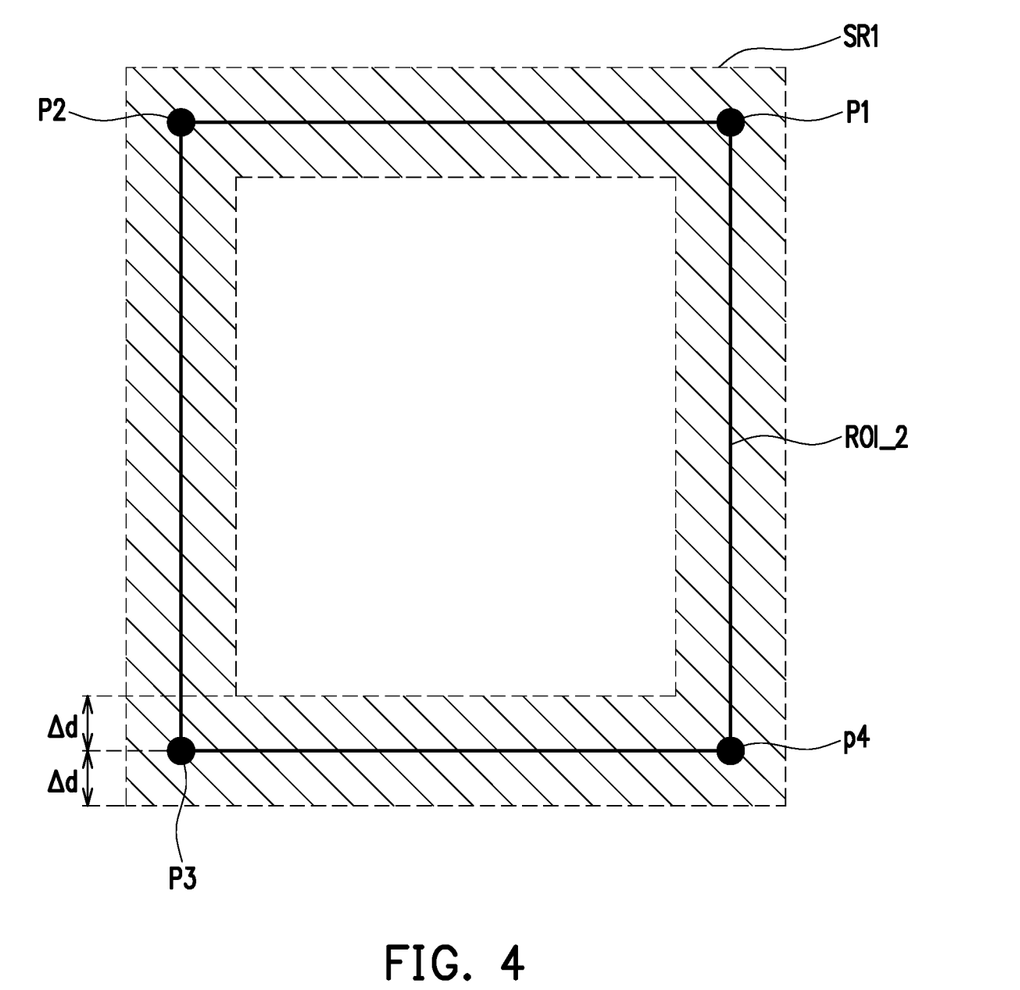
FIG. 4 is a schematic diagram illustrating a predefined searching area according to an embodiment of the disclosure.

FIG. 4 is an example illustrating the predefined searching area according to an embodiment of the disclosure. With reference to FIG. 4, a predefined searching area SR1 is a frame-shaped area generated by extending a preset distance Δd (for example, 5 pixels) outwardly and inwardly from a boundary of a previous region of interest ROI_2. The processor 120 may read the coordinates of the four vertices P1-P4 of the previous region of interest ROI_2 from the storage circuit 110 to obtain the previous region of interest ROI_2 and generate the predefined searching area SR1 based on the preset distance. Although the region of interest illustrated in the example of FIG. 4 is a rectangle, the disclosure does not limit the shape of the region of interest. The shape of the region of interest may be a regular or an irregular polygon.

In addition, it should be noted that for a first image of the image sequence, the first image does not have the previous image. Therefore, the region of interest of the first image may be preset. Alternatively, the region of interest of the first image may be automatically generated or estimated by identifying the outer rim of the reference object via other image recognition techniques.

Next, in step S303, the processor 120 performs feature matching on multiple image features within the predefined searching area in the previous image and multiple image features within the predefined searching area in the current image. In step S304, the processor 120 determines whether the image features within the predefined searching area in the current image satisfy a matching condition.

Specifically, via feature extraction, the processor 120 captures multiple image features from the predefined searching area in the previous image. Similarly, the processor 120 also captures multiple image features from the predefined searching area in the current image. The feature extraction may include algorithms such as Scale Invariant Feature Transformation (SIFT) or Speeded Up Robust Features (SURF). Next, the processor 120 performs the feature matching on the image features within the predefined searching area in the previous image and the image features within the predefined searching area in the current image. Then, the processor 120 determines the similarity between an image content within the predefined searching area in the previous image and an image content within the predefined searching area in the current image based on the result of the feature matching to determine whether the image features within the predefined searching area in the current image satisfy the matching condition.

Figure 5:
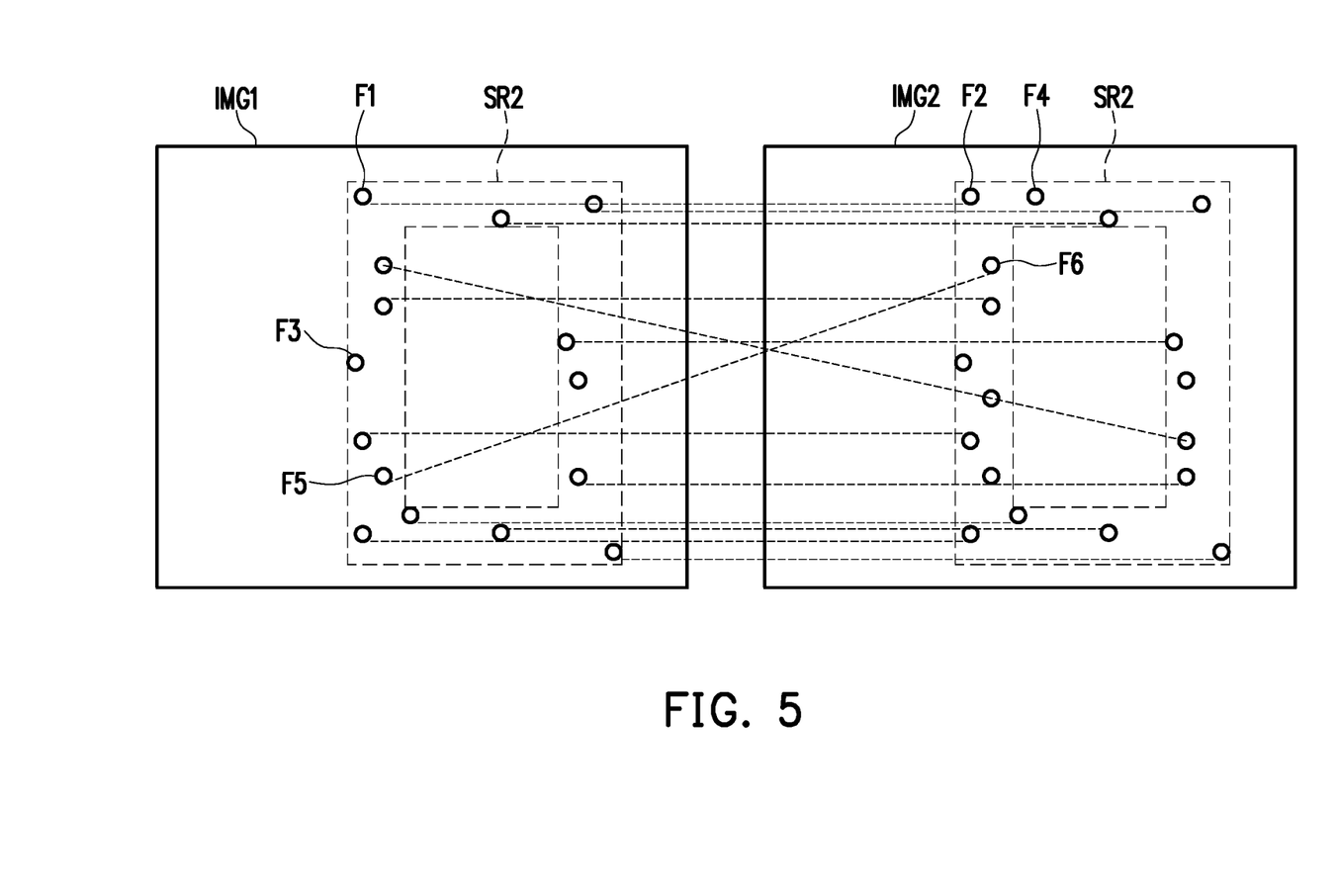
FIG. 5 is a schematic diagram illustrating a feature matching according to an embodiment of the disclosure.

For example, FIG. 5 is an exemplary schematic diagram illustrating the feature matching according to an embodiment of the disclosure. The processor 120 may perform the feature extraction on a predefined searching area SR2 in a previous image IMG1 to obtain multiple image features (for example, an image feature F1, an image feature F3 and an image feature F5) in the previous image IMG1. Also, the processor 120 may perform the feature extraction on the predefined searching area SR2 in a current image IMG2 to obtain multiple image features (for example, an image feature F2, an image feature F4 and an image feature F6) in the current image IMG2. Next, the processor 120 may perform the feature matching on the image features within the predefined searching area SR2 in the previous image IMG1 and the image features within the predefined searching area SR2 in the current image IMG2 to obtain multiple matching feature pairs (for example, the matching feature pairs constituted by the image feature F1 and the image feature F2). It is known that not every feature can be successfully matched, for example, neither the image feature F3 nor the image feature F4 finds a matching feature. In addition, corresponding to places of similar texture, matching error may also occur. For example, the image feature F5 is matched to the image feature F6, but the image feature F5 and the image feature F6 are respectively corresponding to different scene content. The number of features that are not matched, the number of successfully matched features and the situation of an erroneous matching may be used to measure the similarity between the image content within the predefined searching area in the previous image and the image content within the predefined searching area in the current image. Therefore, in an embodiment, the number of successfully matched features may be used to determine whether the image features within the predefined searching area in the current image satisfy the matching condition. It is known that when the number of features that are not matched is too high or the number of successfully matched features is too low, it means that the reference object may be moved. As a result, the similarity is low between the image content within the predefined searching area in the previous image and the image content within the predefined searching area in the current image. What should be noted is that, in another embodiment, the processor 120 may perform the feature extraction and the feature matching on the image content in the previous region of interest in the previous image and the image content within the predefined searching area in the current image to determine whether the image features within the predefined searching area in the current image satisfy the matching condition.

In response to that the image features within the predefined searching area in the current image do not satisfy the matching condition (the result of step S304 is No), in step S305, the processor 120 generates multiple test searching areas based on the posture of the specific object appearing in the image sequence and the predefined searching area. For example, in response to that the number of the successfully matched features within the predefined searching area in the current image is less than 60% of all image features within the predefined searching area in the current image, the processor 120 determines that the image features within the predefined searching area in the current image do not satisfy the matching condition and further generates multiple test searching areas. In step S306, the processor 120 obtains the current region of interest in the current image based on multiple image features within one of the test searching areas in the current image.

Specifically, in response to that the image features within the predefined searching area in the current image do not satisfy the matching condition, it means that the processor 120 is unable to search for an appropriate current region of interest from the predefined searching area in the current image and the reference object may be moved significantly. Therefore, in the embodiment of the disclosure, the processor 120 may shift and rotate the predefined searching area to generate multiple test searching areas so as to search for the appropriate current region of interest from these test searching areas. Similarly, the processor 120 sequentially performs feature extraction on the current image based on these test searching areas and matches the image features obtained from these test searching areas with the image features within the predefined searching area in the previous image. Next, the processor 120 searches for the appropriate current region of interest from one of the test searching areas with high level of matching. That is, the processor 120 obtains the current region of interest in the current image based on multiple image features within one of the test searching areas. Here, the processor 120 may adjust a position of the previous region of interest based on the coordinate position of the image features within one of the test searching areas that satisfy the matching condition. For example, shifting or rotating the previous region of interest based on the coordinate positions of the image features to obtain the current region of interest in the current image.

It is worth mentioning that in the embodiment of the disclosure, a movement amount configured to shift and rotate the predefined searching area to generate the test searching area is generated based on the posture of the specific object of the image sequence. Specifically, by analyzing the posture of the specific object in the previous region of interest and the posture of the specific object in the current region of interest, the processor 120 may predict an offset status of the reference object. Therefore, the processor 120 may generate multiple test searching areas based on the posture of the specific object in an attempt to search for the appropriate current region of interest from these test searching areas. For example, assuming that the region of interest is disposed corresponding to the bed, the specific object may include a human body. In other words, the specific object may be an adult, a child, an elderly person, an infant or a pregnant woman. The processor 120 may perform a human body detection to detect the human body from the image and obtain a skeleton information of the human body. For example, the processor 120 may use the human key point real-time detection (OpenPose) algorithm to obtain the skeleton information of the human body based on a human detection function provided by the well-known open source library OpenCV. Based on the skeleton information of the human body, the processor 120 may analyze an upper body position and an upper body angle of a skeleton of the human body. In an embodiment, the processor 120 may generate multiple test searching areas based on the upper body position and the upper body angle of the skeleton of the human body. It is worth mentioning that if the bed is moved and offset occurs, similar offset also occurs to the human body on the bed. In addition, the posture of an upper torso of the human body is specifically related to a placement of the reference object (for example, the bed). However, a posture of the human limbs is not specifically related to the placement of reference object (for example, the bed). Therefore, by observing the posture of the upper torso of the human body, that is, the upper body position and the upper body angle of an upper body skeleton, the offset occurring to the current region of interest of a corresponding reference object may be estimated. For example, the processor 120 may perform a table lookup based on the upper body position and the upper body angle of the skeleton to obtain the movement amount, and shift and rotate the predefined searching area based on the movement amount to generate multiple test searching areas. Or, the processor 120 may compare the skeleton information in the current image with the skeleton information in the previous image to estimate the movement amount, and shift and rotate the predefined searching area based on the movement amount to generate multiple test searching areas. The above embodiment is elaborated by taking the posture of the specific object as the skeleton information of the specific object as an example. However, in other embodiments, the posture of the specific object is also a contour information of the specific object. That is, the movement amount configured to shift and rotate the predefined searching area to generate multiple test searching areas may also be estimated based on the contour information of the specific object. The contour information may include a neck position or a shoulder position, etc., and is not limited by the disclosure. It is known that the shapes of these test searching areas are the same as the predefined searching area.

On the other hand, in response to that the image features within the predefined searching area in the current image satisfy the matching condition (the result of step S304 is Yes in), in step S307, the processor 120 adjusts the position of the previous region of interest in the previous image based on the image features within the predefined searching area in the current image to obtain the current region of interest in the current image. Specifically, if the image features within the predefined searching area in the current image satisfy the matching condition, it means that the processor 120 has searched for the appropriate current region of interest from the predefined searching area.

As a result, the processor 120 may compare the coordinate positions of the matching image features in the previous image to that in the current image to determine how to rotate and move the previous region of interest to generate the current region of interest. That is, the processor 120 may calculate an offset amount based on the image features within the predefined searching area in the previous image and the image features within the predefined searching area in the current image. The processor 120 may calculate the offset amount based on the coordinate difference between the two matching image features respectively located in the current image and the previous image. The offset amount may include a shift amount and a rotation amount. Next, the processor 120 may shift and rotate the previous region of interest based on the offset amount to obtain the current region of interest. For example, the processor 120 may move the previous region of interest 5 pixels to the right and rotate 5 degrees to generate the current region of interest.

What should be elaborated is that based on the flow of FIG. 3, if the image features within the predefined searching area in the current image satisfy the matching condition, the processor 120 generates the current region of interest based on the predefined searching area. Otherwise, the processor 120 generates the current region of interest based on the test searching area.

In addition, the description of FIG. 3 is elaborated by two images in the image sequence. However, for the image sequence including multiple consecutive frames, the flow shown in FIG. 3 is repeatedly performed to instantly obtain the region of interest of each of the consecutive frames.

Figure 6A:
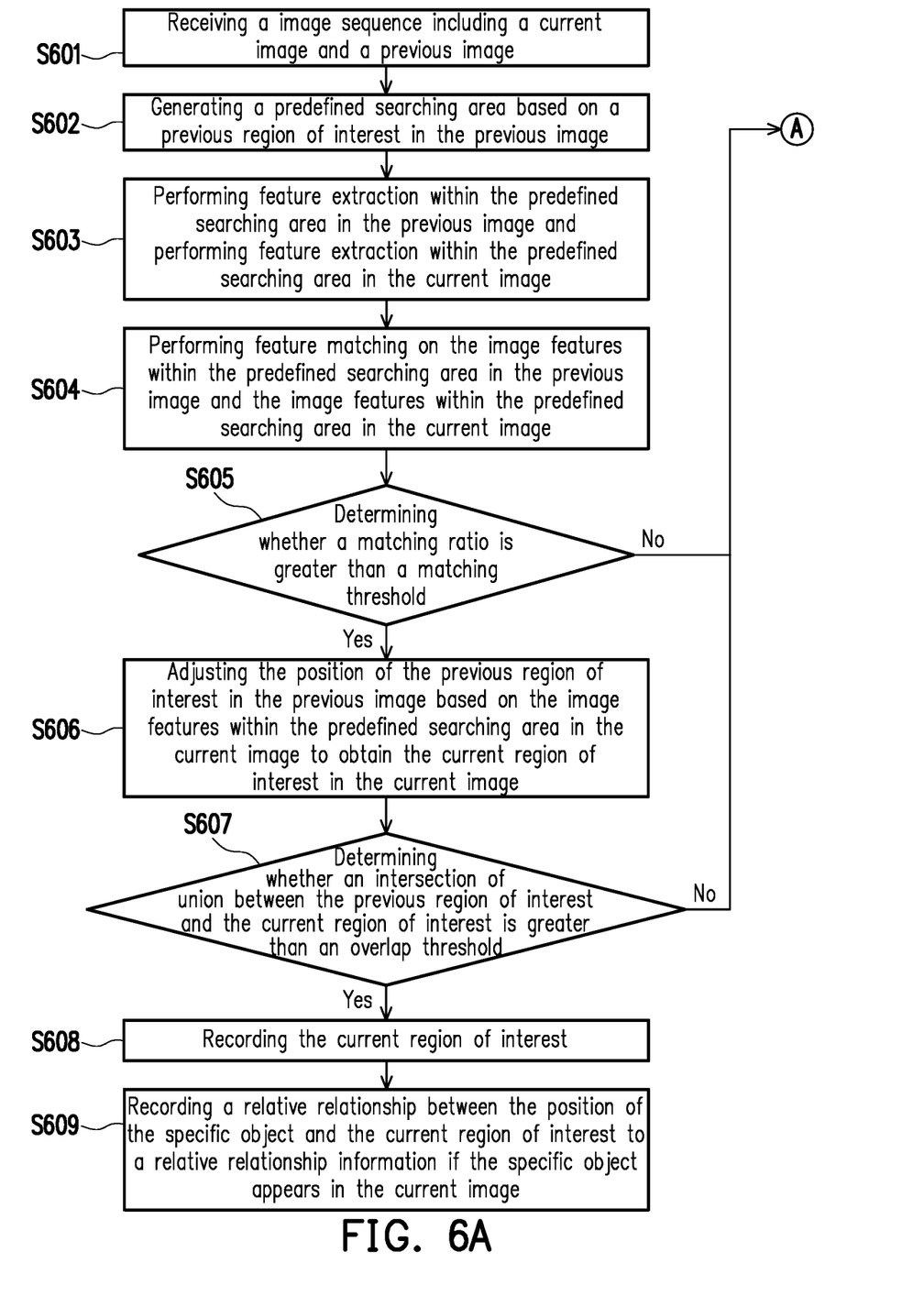
FIG. 6A and FIG. 6B are flow charts illustrating the method for adjusting the region of interest according to an embodiment of the disclosure.
Figure 6B:
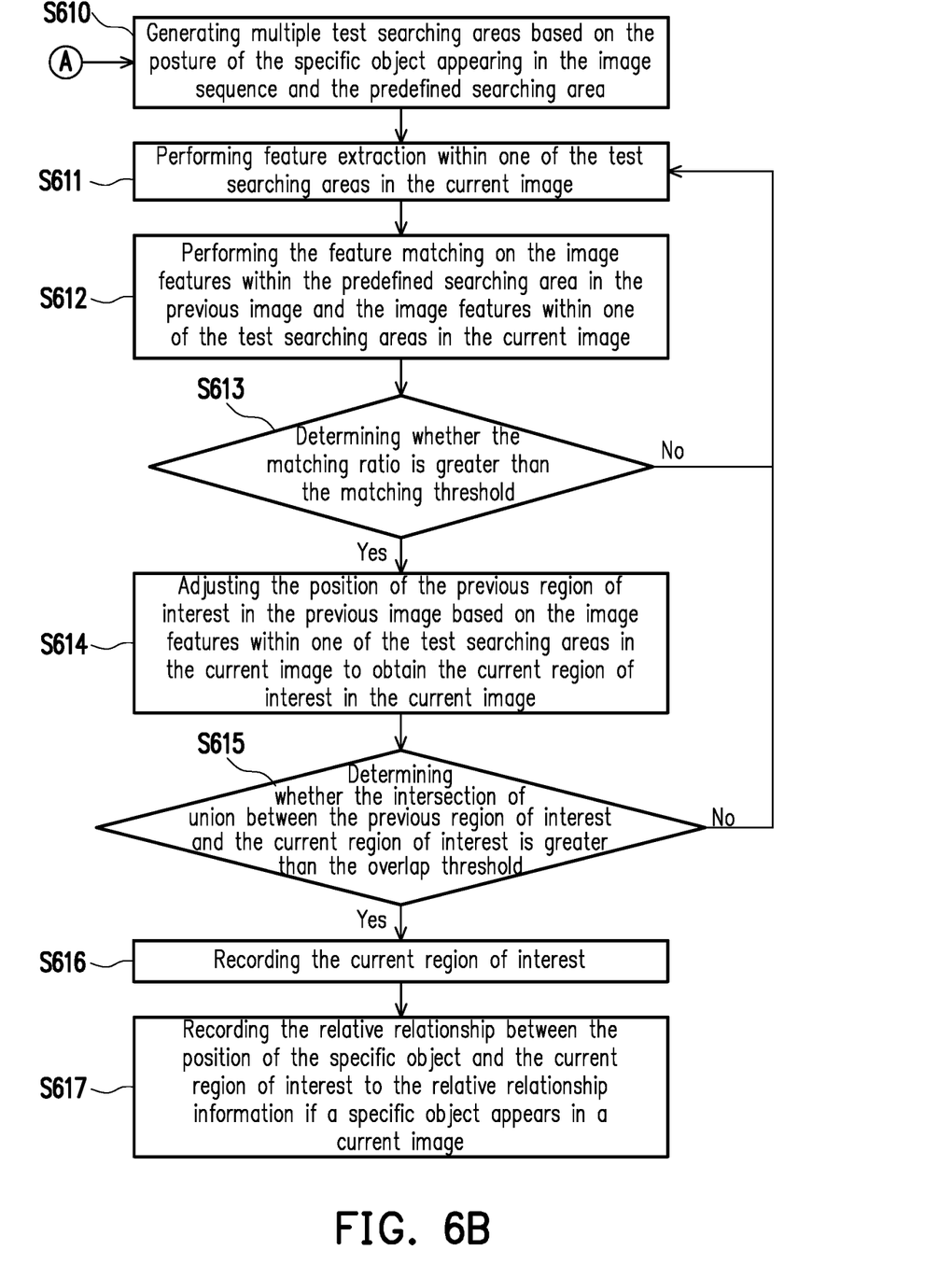

In order to elaborate more clearly an embodiment of the disclosure, FIG. 6A and FIG. 6B are flowcharts illustrating the method for adjusting the region of interest according to an embodiment of the disclosure. With reference to FIG. 1, FIG. 6A and FIG. 6B, the method of the embodiment is adapted to the computing device 100 in the above embodiment. Detailed steps of the method for adjusting the region of interest of the embodiment are elaborated below with reference to each of the components of the computing device 100.

In step S601, the processor 120 receives the image sequence including the previous image and the current image. In step S602, the processor 120 generates the predefined searching area based on the previous region of interest in the previous image. In step S603, the processor 120 may perform the feature extraction on the predefined searching area in the previous image and the predefined searching area in the current image. In step S604, the processor 120 performs the feature matching on the image features within the predefined searching area in the previous image and the image features within the predefined searching area in the current image. The results of the feature extraction and the feature matching are shown, for example, in the example of FIG. 5.

In step S605, the processor 120 determines whether a matching ratio between the number of successfully matched features and the number of image features within the predefined searching area in the current image is greater than a matching threshold. For example, after performing feature matching, if the number of successfully matched features is M and the number of features within the predefined searching area in the current image is N, the matching ratio is M/N. The processor 120 determines whether the matching ratio M/N is greater than the matching threshold (for example, 75%) to determine whether the image features within the predefined searching area in the current image satisfy the matching condition. The matching threshold may be designed based on practical applications, and the disclosure is not limited thereto. In response to that the matching ratio is no greater than the matching threshold, the image features within the predefined searching area in the current image do not satisfy the matching condition. In contrast, in response to that the matching ratio is greater than the matching threshold, the image features within the predefined searching area in the current image satisfy the matching condition.

In response to that the matching ratio is greater than the matching threshold (the result of S605 is Yes), in step S606, the processor 120 adjusts the position of the previous region of interest in the previous image based on the image features within the predefined searching area in the current image to obtain the current region of interest in the current image. What should be particularly noted is that before calculating the offset amount configured to adjust the previous region of interest based on the matching feature, the processor 120 may first delete the erroneous matching result. Taking FIG. 5 for an example, the processor 120 may delete the image feature F5 and the image feature F6 not basing on the incorrectly matched image feature F5 and image feature F6 to determine the current region of interest. Specifically, the processor 120 may delete the erroneous matching result from multiple matching feature pairs generated by the feature matching to filter the matching feature pairs configured to calculate the offset amount. Here, each of the matching feature pairs includes one of the image features within the predefined searching area in the previous image and one of the image features within the predefined searching area in the current image. For example, the processor 120 may repeatedly calculate a slope rate of a line between two matching image features (that is, matching feature pairs). Next, the processor 120 may sort all slope rates and delete the matching feature pairs corresponding to the top and the last 20% of the slope rates to estimate the current region of interest based on the remaining 60% of matching feature pairs. Or, the processor 120 may also perform RANdom SAmple Consensus (RANSAC) algorithm to delete the erroneous result. After deleting the erroneous result, the processor 120 may calculate the offset amount configured to adjust the previous region of interest based on the correctly matched image features to obtain the current region of interest.

After calculating the current region of interest, in step S607, the processor 120 determines whether an intersection of union (IOU) between the previous region of interest and the current region of interest is greater than an overlap threshold to further determine whether the displacement of the current region of interest is reasonable compared to that of the previous region of interest. The intersection of union is a ratio of an area intersection and an area association between the previous region of interest and the current region of interest, which is a value between 0 and 1. The matching threshold (0.5, for example) may be designed based on practical applications. The disclosure is not limited thereto.

In response to that the intersection of union between the previous region of interest and the current region of interest is greater than the overlap threshold (the result of step S607 is Yes), in step S608, the processor 120 records the current region of interest. In addition, in response to that the intersection of union between the previous region of interest and the current region of interest is greater than the overlap threshold, in step S609, the processor 120 records a relative relationship between the current region of interest and the position of the specific object appearing in the current image to a relative relationship information. Specifically, after obtaining the current region of interest in the current image, a position of the current region of interest, a position of the corresponding specific object and a corresponding relationship between the two are recorded. The position of the specific object being recorded may be referred to as a historical position. In response to that the specific object does not appear in the current image, step S609 may be skipped. Step S609 is configured to generate the test searching area and will be further elaborated later.

However, the results of step S605 or step S607 are No, which indicates that the number of successfully matched features determined in step S605 is too low, or that the intersection of union between the previous region of interest and the current region of interest determined in step S607 is too small. In another embodiment, the intersection of union is too small, which indicates that the current region of interest is not reasonable. The computing device 100 regards the current region of interest obtained in step S606 as an unreasonable region of interest and continues to perform step S610. In response to that the results of step S605 or step S607 are No, in step S610, the processor 120 generates multiple test searching areas based on the posture of the specific object appearing in the image sequence and the predefined searching area. The test searching areas are generated by shifting and rotating the predefined searching area, and the content for describing how to generate the test searching area will be elaborated in detail later. After generating multiple test searching areas, in step S611, the processor 120 performs the feature extraction on one of the test searching areas in the current image. In step S612, the processor 120 performs the feature matching on the image features within the predefined searching area in the previous image and on the image features within one of the test searching areas in the current image. In step S613, the processor 120 determines whether the image features within one of the test searching areas in the current image satisfy the matching condition. That is, the processor 120 determines whether the matching ratio between the number of successfully matched features and the number of image features within one of the test searching areas in the current image is greater than the matching threshold.

In response to that the image features within one of the test searching areas in the current image satisfy the matching condition (that is, the matching ratio is greater than the matching threshold), in step S614, the processor 120 adjusts the position of the previous region of interest in the previous image based on the image features within one of the test searching areas in the current image to obtain the current region of interest in the current image. The operations of steps S611 to S614 are similar to the operations of steps S603 to S606 so will not be elaborated again. The only difference between steps S611 to S614 and steps S603 to S606 is that steps S603 to S606 are based on the predefined searching area in the current image to perform analysis and processing, and steps S611 to S614 are based on one of the test searching areas in the current image to perform analysis and processing.

After generating the current region of interest based on one of the test searching areas, in step S615, the processor 120 determines whether the intersection of union between the previous region of interest and the current region of interest is greater than the overlap threshold. In response to that the intersection of union between the previous region of interest and the current region of interest is greater than the overlap threshold, in step S616, the processor 120 records the current region of interest. In step S617, the processor 120 records the relative relationship between the current region of interest and the position of the specific object appearing in the current image to the relative relationship information. Similar to step S609, in step S617, after obtaining the final determination result of the current region of interest, the position of the current region of interest, the position of the corresponding specific object, and the corresponding relationship between the two are recorded.

On the other hand, in response to that the image features within one of the test searching areas in the current image do not satisfy the matching condition (the result of step S613 is No) or in response to that the intersection of union between the previous region of interest and the current region of interest is no greater than the overlap threshold (the result of step S615 is No), back to step S611, the processor 120 performs feature extraction on another one of test searching areas in the current image. Next, back to step S612, the processor 120 performs the feature matching on the image features within the predefined searching area in the previous image and multiple image features within one of another test searching areas in the current image. It is known that steps S613 to S615 are also repeatedly performed based on one of another test searching areas.

Figure 7:
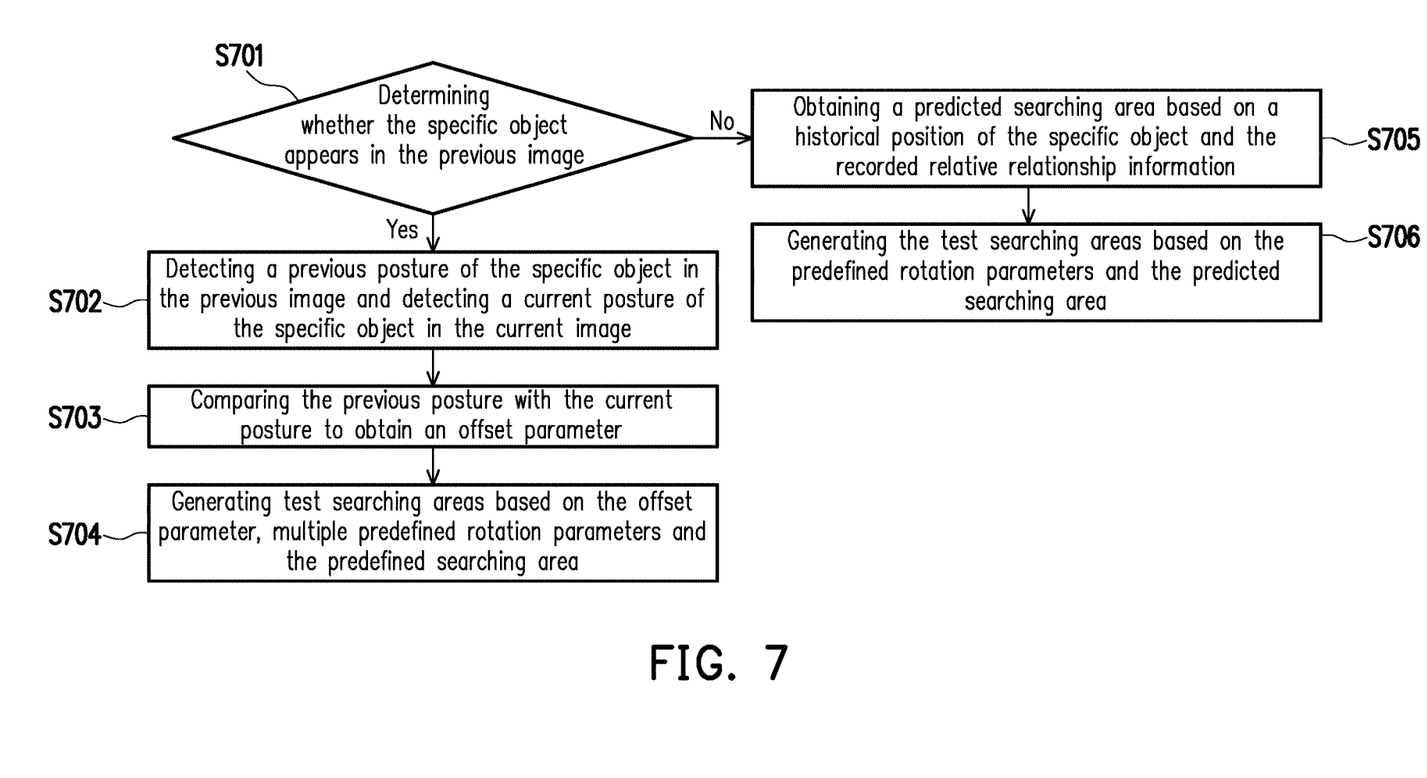
FIG. 7 is a flow chart illustrating a generation of multiple test searching areas according to an embodiment of the disclosure.

Embodiments will be listed below to elaborate how to generate multiple test searching areas based on the posture of the specific object. FIG. 7 is a flow chart illustrating the method for adjusting the region of interest according to an embodiment of the disclosure. With reference to FIG. 1 and FIG. 7, the method of the embodiment of the disclosure is adapted to the computing device 100 in the above embodiment. Detailed steps of the method for adjusting the region of interest of the embodiment are elaborated below with reference to each of the components of the computing device 100.

In step S701, the processor 120 determines whether the specific object appears in the previous region of interest in the previous image. Specifically, the processor 120 may perform an object recognition and determine whether the specific object appears in the previous region of interest based on the position of the recognized object. In response to that the specific object appears in the previous region of interest in the previous image (the result of step S701 is Yes), in step S702, the processor 120 detects a previous posture of the specific object in the previous image, and detects a current posture of the specific object in the current image. In another embodiment, the processor 120, in step S701, may further determine whether the specific object appears in the current image. As a result, in response to that the specific object appears in the previous region of interest in the previous image and the specific object appears in the current image (the result of step S701 is Yes), in step S702, the processor 120 detects the previous posture of the specific object in the previous image, and detects the current posture of the specific object in the current image. Next, in step S703, the processor 120 compares the previous posture to the current posture to obtain an offset parameter. In step S704, the processor 120 generates multiple test searching areas based on the offset parameter, multiple predefined rotation parameters and the predefined searching area.

Specifically, taking the specific object as the human body and setting the region of interest corresponding to a bed for an example, the processor 120 may detect the skeleton information of the human body on the bed from the previous image, and may also detect the skeleton information of the same human body from the current image. The processor 120 calculates the offset parameter including a shift parameter and a rotation parameter by comparing the skeleton information in the previous image to the skeleton information in the current image. In general, the posture of the upper torso of the human body is quite related to the way the bed is put. However, the position and the posture of the limbs are not related to the way the bed is put. In addition, the upper body skeleton generated by a skeleton detection based on image analysis does not have significant difference when lying down on the back and lying down on the side. Therefore, in an embodiment of the disclosure, the processor 120 may calculate the offset parameter including the shift parameter and the rotation parameter by comparing the upper body position and the upper body angle of the upper body skeleton in the previous image to the upper body position and the upper body angle of the upper body skeleton in the current image. The above offset parameter is, for example, moving S pixels to the right and rotating by T degrees. Next, the processor 120 may move the predefined searching area S pixels to the right and rotate T degrees to generate one of the test searching areas. Moreover, the processor 120 may further adjust the rotation parameter based on multiple predefined rotation parameters. For example, the processor 120 may add or subtract 10 degrees from the T degree, add or subtract 20 degrees to obtain 4 other rotation parameters (that is, the predefined rotation parameters are +20 degrees, −20 degrees, +10 degrees and −10 degrees) and generate other test searching areas based on the 4 other rotation parameters above (that is, T+20 degrees, T−20 degrees, T+10 degrees, and T−10 degrees). In this case, by using multiple groups of test searching areas, the chances of finding the appropriate current range of interest based on the test searching area may be improved. However, the disclosure does not limit the number of test searching areas and may increase or decrease the number of test searching areas based on practical applications.

Figure 8:
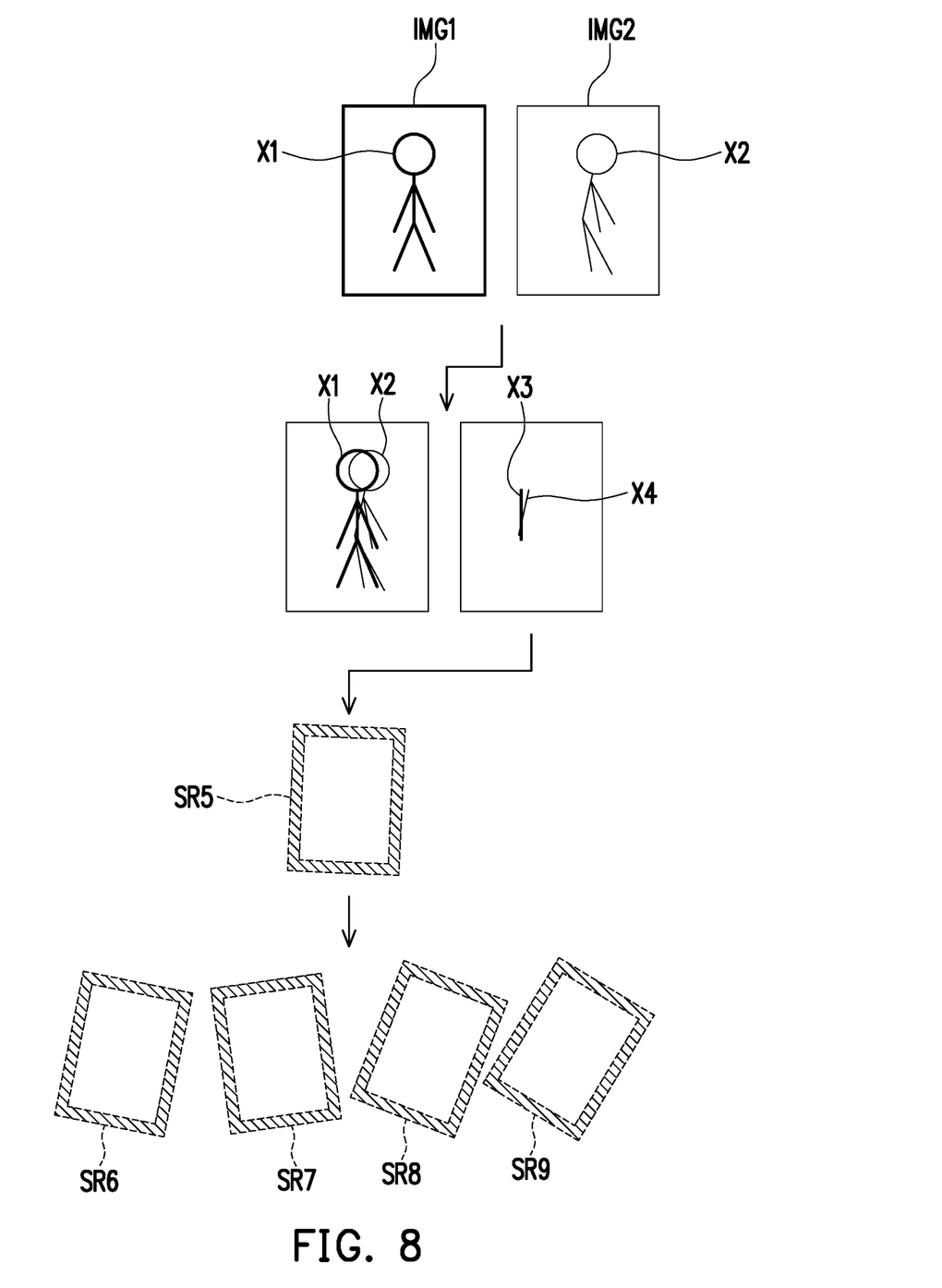
FIG. 8 is a schematic diagram illustrating a generation of multiple test searching areas according to an embodiment of the disclosure.

To clearly elaborate, the embodiment shown in FIG. 8 is elaborated by taking the specific object as the human body and setting the region of interest corresponding to the bed as an example. FIG. 8 is a schematic diagram illustrating a generation of multiple test searching areas according to an embodiment of the disclosure. With reference to FIG. 8, the processor 120 may detect a human skeleton X1 from the previous image IMG1 and detect a human skeleton X2 from the current image IMG2. Next, the processor 120 compares the human skeleton X1 to the human skeleton X2 to obtain a displacement amount and the rotation amount between an upper body skeleton X3 of the human skeleton X1 and an upper body skeleton X4 of the human skeleton X2 as the shift parameter and the rotation parameter in the offset parameter. Then, the processor 120 may shift and rotate predefined searching area based on the offset parameter generated by the upper body skeleton X3 and the upper body skeleton X4 to generate a test searching area SR5. Also, the processor 120 may rotate the test searching area SR5 based on the predefined rotation parameter to generate other 4 test searching areas SR6-SR9. Through this, if the processor 120 may not find the current region of interest from the predefined searching area, the processor 120 may attempt to search for the current region of interest from the test searching areas SR5~SR9.

On the other hand, in response to that the specific object not appearing in the previous region of interest in the previous image, in step S705, the processor 120 obtains a predicted searching area based on the historical position of the specific object and the recorded relative relationship information. In step S706, the processor 120 generates the test searching area based on the predefined rotation parameter and the predicted searching area.

Specifically, it may be known from steps S609 and S617 of FIG. 6A and FIG. 6B that when the processor 120 obtains the appropriate current region of interest and the specific object appears in the current region of interest, the processor 120 records the position of the current region of interest, the position of the corresponding specific object, and the corresponding relationship between the two. Table 1 is the example of the relative relationship based on an embodiment of the disclosure.

TABLE 1

| Image number | The position of the specific object | The position of the region of interest |
|---|---|---|
| 1 | Object position 1 | Region position 1 |
| 2 | Object position 2 | Region position 2 |
| 3 | Object position 3 | Region position 3 |
| 4 | n/a | Region position 4 |
| 5 | n/a | Region position 5 |
| 6 | n/a | Region position 6 |
| . | . | . |
| . | . | . |
| . | . | . |
| n | Object position n | Region position n |

As shown in Table 1, the relative relationship information includes the position of the region of interest in each of the images and the position of the corresponding specific object, wherein "n/a" means that the specific object does not exist. Taking the specific object as the human body and setting the region of interest corresponding to the bed for an example, through a long-term record of the relative relationship information, the processor 120 may estimate the habit of the human body lying on the bed by organizing the information in Table 1. For example, the processor 120 may organize the information in Table 1 to estimate that the human body may be accustomed to lying on the right side of the bed. Specifically, the processor 120 may first calculate the relative position information between each of the object positions and each of the area positions in the relative relationship information (for example, calculating a relative position information between an "object position 1" and an "area position 1"). Next, the processor 120 may calculate the average of all relative position information to generate an average relative position information. The average relative position information may represent the information of the habit of the human body lying on the bed. Under the condition that the information of the habit of the human body lying on the bed is provided, the processor 120 may estimate a possible position of the bed (that is, the region of interest) based on the position of the human body in a single image and the average relative position information above.

To be more specifically, in the embodiment of the disclosure, if the specific object does not appear in the previous region of interest in the previous image, the processor 120 may predict a predicted region of interest based on the last historical position that the human body once appeared in the image sequence and the average relative position information generated based on the recorded relative relationship information. Also, the processor 120 may generate the predicted searching area serving as one of the test searching areas based on the predicted region of interest. In addition, after obtaining the predicted searching area, the processor 120 may rotate the predicted searching area based on multiple predefined rotation parameters to obtain other test searching areas.

Taking Table 1 as an example, if the previous image is the fifth image and the current image is the sixth image, the processor 120 determines that the specific object does not exist in the previous image. Therefore, the processor 120 predicts a predicted region of interest based on the last historical position that the human body once appeared in the image sequence, that is, based on the "object position 3" in the third image and the average relative position information. Also, by calculating the relative position information between the "object position 1" and a corresponding "region position 1", the relative position information between an "object position 2" and a corresponding "region position 2", and the relative position information between an "object position 3" and a "region position 3", the average relative position information above may be generated. After generating the predicted region of interest based on the "object position 3" and the average relative position information, the processor 120 may extend the preset distance outwardly and inwardly from the boundary of the predicted region of interest to generate the predicted searching area. Thereby, regardless of whether the specific object appears in the previous image, the processor 120 may generate the test searching area based on the posture of the specific object appearing in the image sequence.

Based on the above, the embodiment of the disclosure may automatically detect the appropriate region of interest, thereby improving recognition and detection efficiency. By this, based on an ideal region of interest, the embodiment of the disclosure may improve the accuracy and efficiency of an image monitoring on the specific object. In addition, the embodiment of the disclosure may generate the test searching area with reference to the posture of the specific object to improve search efficiency. Furthermore, since the searching area for searching the region of interest in the embodiment of the disclosure is frame-shaped, the chances of an erroneous feature matching may be reduced. Thereby, it is possible to avoid the situation of not being able to generate the region of interest close to the outer rim of the reference object due to high erroneous feature matching rate.

Although the disclosure has been elaborated with reference to the above embodiments, it will be apparent to the person of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A method for adjusting a region of interest, adapted to a computing device comprising a processor and comprising:
receiving an image sequence comprising a current image and a previous image;
generating a predefined searching area with a frame shape by extending a preset distance outwardly and inwardly from a boundary of a previous region of interest in the previous image;
performing feature matching on a plurality of image features within the predefined searching area in the previous image and a plurality of image features within the predefined searching area in the current image; and
adjusting a position of the previous region of interest in the previous image based on the image features within the predefined searching area in the current image to obtain a current region of interest in the current image in response to that the image features within the predefined searching area in the current image satisfy a matching condition.

2. The method according to claim 1, further comprising:
determining whether a matching ratio between the number of successfully matched features and the number of the image features within the predefined searching area in the current image is greater than a matching threshold,
wherein in response to that the matching ratio is not greater than the matching threshold, the image features within the predefined searching area in the current image do not satisfy the matching condition; and in response to that the matching ratio is greater than the matching threshold, the image features within the predefined searching area in the current image satisfy the matching condition.

3. The method according to claim 1, further comprising:
generating a plurality of test searching areas based on a posture of a specific object appearing in the image sequence and the predefined searching area in response to that the image features within the predefined searching area in the current image do not satisfy the matching condition; and
obtaining the current region of interest in the current image based on a plurality of image features within one of the test searching areas in the current image.

4. The method according to claim 3, further comprising:
determining whether an intersection of union between the previous region of interest and the current region of interest is greater than an overlap threshold;
performing feature matching on the image features within the predefined searching area in the previous image and the image features within one of the test searching areas in the current image in response to that the intersection of union between the previous region of interest and the current region of interest is not greater than the overlap threshold; and
recording the current region of interest in response to that the intersection of union between the previous region of interest and the current region of interest is greater than the overlap threshold.

5. The method according to claim 3, wherein obtaining the current region of interest in the current image based on the image features within one of the test searching areas in the current image comprising:
performing feature matching on the image features within the predefined searching area in the previous image and the image features within one of the test searching areas in the current image;
adjusting the position of the previous region of interest in the previous image based on the image features within one of the test searching areas in the current image to obtain the current region of interest in the current image in response to that the image features within one of the test searching areas in the current image satisfy the matching condition; and
performing feature matching on the image features within the predefined searching area in the previous image and a plurality of image features in another of the test searching areas in the current image in response to that the image features within the one of the test searching areas in the current image do not satisfy the matching condition.

6. The method according to claim 3, wherein generating the test searching areas based on the posture of the specific object appearing in the image sequence and the predefined searching area comprises:
determining whether the specific object appears in the previous region of interest in the previous image;
detecting a previous posture of the specific object in the previous image and detecting a current posture of the specific object in the current image in response to that the specific object appears in the previous region of interest in the previous image;
comparing the previous posture with the current posture to obtain an offset parameter; and
generating the test searching areas based on the offset parameter, a plurality of predefined rotation parameters and the predefined searching area.

7. The method according to claim 6, wherein generating the test searching areas based on the posture of the specific object appearing in the image sequence and the predefined searching area further comprises:
obtaining a predicted searching area based on a historical position of the specific object and recorded relative relationship information in response to that the specific object does not appear in the previous region of interest in the previous image; and
generating the test searching areas based on the predefined rotation parameters and the predicted searching area.

8. The method according to claim 3, wherein the posture of the specific object comprises an upper body position and an upper body angle of a skeleton of the specific object.

9. The method according to claim 1, wherein adjusting the position of the previous region of interest in the previous image to obtain the current region of interest in the current image comprises:
calculating an offset amount according to the successfully matched image features in the previous image and the successfully matched image features in the current image; and
adjusting the position of the previous region of interest according to the offset amount to obtain the current region of interest.

10. The method according to claim 1, wherein the test predefined searching areas have the same shape as the predefined searching area.

11. A computing device, comprising:
a storage circuit storing a plurality of modules; and
a processor coupled to the storage circuit and configured to access the modules to:
receive an image sequence comprising a current image and a previous image;
generate a predefined searching area with a frame shape by extending a preset distance outwardly and inwardly from a boundary of a previous region of interest in the previous image;
perform feature matching on a plurality of image features within the predefined searching area in the previous image and a plurality of image features within the predefined searching area in the current image; and
adjust a position of the previous region of interest in the previous image based on the image features within the predefined searching area in the current image to obtain a current region of interest in the current image in response to that the image features within the predefined searching area in the current image satisfy a matching condition.

12. The computing device according to claim 11, wherein the processor is further configured to:
determine whether a matching ratio between the number of successfully matched features and the number of the image features within the predefined searching area in the current image is greater than a matching threshold,
wherein in response to that the matching ratio is not greater than the matching threshold, the image features within the predefined searching area in the current image do not satisfy the matching condition; and in response to that the matching ratio is greater than the matching threshold, the image features within the predefined searching area in the current image satisfy the matching condition.

13. The computing device according to claim 11, wherein the processor is further configured to:
generate a plurality of test searching areas based on a posture of a specific object appearing in the image sequence and the predefined searching area in response to that the image features within the predefined searching area in the current image do not satisfy the matching condition; and
obtaining the current region of interest in the current image based on a plurality of image features in one of the test searching areas in the current image.

14. The computing device according to claim 13, wherein the processor is further configured to:
determine whether an intersection of union between the previous region of interest and the current region of interest is greater than an overlap threshold;
perform feature matching on the image features within the predefined searching area in the previous image and the image features within one of the test searching areas in response to that the intersection of union between the previous region of interest and the current region of interest is not greater than the overlap threshold; and
record the current region of interest in response to that the intersection of union between the previous region of interest and the current region of interest is greater than the overlap threshold.

15. The computing device according to claim 13, wherein the processor is further configured for:
performing feature matching on the image features within the predefined searching area in the previous image and the image features within one of the test searching areas in the current image;
adjusting the position of the previous region of interest in the previous image based on the image features within one of the test searching areas in the current image to obtain the current region of interest in the current image in response to that the image features within one of the test searching areas in the current image satisfy the matching condition; and
performing feature matching on the image features within the predefined searching area in the previous image and a plurality of image features in another of the test searching areas in the current image in response to that the image features within the one of the test searching areas in the current image do not satisfy the matching condition.

16. The computing device according to claim 13, wherein the processor is further configured to:
determine whether the specific object appears in the previous region of interest in the previous image;
detecting a previous posture of the specific object in the previous image and detecting a current posture of specific object in the current image in response to that the specific object appears in the previous region of interest in the previous image;
comparing the previous posture to the current posture to obtain an offset parameter; and
generating the test searching areas based on the offset parameter, a plurality of predefined rotation parameters and the predefined searching area.

17. The computing device according to claim 16, wherein the processor is further configured for:
obtaining a predicted searching area based on a historical position of the specific object and recorded relative relationship information in response to that the specific object does not appear in the previous region of interest in the previous image; and
generating the test searching areas based on the predefined rotation parameters and the predicted searching area.

18. The computing device according to claim 13, wherein the posture of the specific object comprises an upper body position and an upper body angle of a skeleton of the specific object.

19. The computing device according to claim 11, wherein the processor is further configured to:
calculate an offset amount based on the successfully matched image features in the previous image and the successfully matched image features in the current image; and
adjusting the position of the previous region of interest based on the offset amount to obtain the current region of interest.

20. The computing device according to claim 11, wherein the test predefined searching areas have the same shape as the predefined searching area.

* * * * *